(12) United States Patent
Ortoman et al.

(10) Patent No.: US 7,705,498 B2
(45) Date of Patent: Apr. 27, 2010

(54) ELECTRIC MOTOR

(75) Inventors: Mirko Ortoman, Longare (IT); Maurizio Basso, Dueville (IT)

(73) Assignee: Nuova S.M.E. - S.p.A., Dronero (IT)

( * ) Notice: Subject to any disclaimer, the term of this patent is extended or adjusted under 35 U.S.C. 154(b) by 390 days.

(21) Appl. No.: 11/587,436

(22) PCT Filed: Apr. 27, 2005

(86) PCT No.: PCT/EP2005/051913

§ 371 (c)(1),
(2), (4) Date: Oct. 25, 2006

(87) PCT Pub. No.: WO2005/107045

PCT Pub. Date: Nov. 10, 2005

(65) Prior Publication Data

US 2007/0216241 A1 Sep. 20, 2007

(30) Foreign Application Priority Data

Apr. 29, 2004 (IT) .......................... PD20040038 U

(51) Int. Cl.
*H02K 11/00* (2006.01)
*H02K 23/66* (2006.01)
(52) U.S. Cl. ...................................... 310/68 B; 310/71
(58) Field of Classification Search ............... 310/68 B, 310/71
See application file for complete search history.

(56) References Cited

U.S. PATENT DOCUMENTS

| 5,319,277 | A | * | 6/1994 | Materne et al. | ............. | 310/239 |
| 5,990,594 | A | * | 11/1999 | Hyatt et al. | ................. | 310/249 |
| 6,127,752 | A | * | 10/2000 | Wiesler | .................... | 310/68 B |
| 6,317,332 | B1 | | 11/2001 | Weber et al. | | |
| 6,340,856 | B1 | * | 1/2002 | Schiller | ................. | 310/156.22 |
| 6,452,383 | B1 | * | 9/2002 | Goedecke | ............. | 324/207.22 |
| 6,577,029 | B1 | * | 6/2003 | Weber et al. | ............. | 310/68 R |
| 2002/0030414 | A1 | | 3/2002 | Mizutani et al. | | |
| 2003/0137202 | A1 | * | 7/2003 | Mao et al. | ................. | 310/68 R |
| 2004/0012296 | A1 | * | 1/2004 | Sakai et al. | ................. | 310/239 |

FOREIGN PATENT DOCUMENTS

EP     0 996 213 A     4/2000
WO    WO 03/098780 A   11/2003

* cited by examiner

*Primary Examiner*—Quyen Leung
*Assistant Examiner*—Alex W Mok
(74) *Attorney, Agent, or Firm*—Modiano & Associati; Albert Josif; Daniel J. O'Byrne

(57) ABSTRACT

An electric motor, comprising a shell for a rotor, which is closed by a cover provided with a hole for the passage of a motor shaft; the cover accommodates and supports sliding contact brushes for a commutator for supplying power to the rotor, a sensor for detecting the rotation rate of the rotor, and connections for signal transmission and power supply of the sensor. The sensor and its connections for the transmission of its signals and for supplying it with power are accommodated in a receptacle, which in turn is then inserted in a complementarily shaped seat in the cover.

5 Claims, 3 Drawing Sheets

ELECTRIC MOTOR

BACKGROUND OF THE INVENTION

Electric motors are currently known which comprise a containment shell for a road tour, which is closed by a cover provided with a hole for the passage of the motor shaft.

The cover accommodates and supports brushes for sliding contact on a commutator for supplying power to the rotor, a sensor for detecting the rotation rate of said rotor, generally of the Hall-effect type, and connections for transmitting signals and for supplying power to said sensor.

The Hall-effect sensor is suitable to detect the passage in front of it of the poles of a magnet that is rigidly coupled to the motor shaft.

Electric motors in which the sensor is installed in the cover or on an equivalent similar flange that supports the brushes are much more compact than electric motors provided with a Hall-effect sensor installed in appropriate additional recesses.

Such additional recesses in fact increase the overall dimensions of the motor; moreover, in view of the particular arrangement of the magnet at a distance from the sensor, these constructive solutions require larger and heavier rotor magnets, with disadvantages in terms of costs, shaft rotation balancing and motor efficiency.

Such electric motors, in which the sensor is installed in the cover or on an equivalent similar flange that supports the brushes, are very compact and can be fitted with relatively small magnets, and although solving the drawbacks exhibited by known electric motors with a Hall-effect rotation rate sensor, have aspects that can be improved.

The fitting of the transmission and power supply connections of said sensor, and the fitting of the power supply lines for any other additional components (such as passive components for the signal line and/or filtering components for supplying power to the rotor), in fact requires welding or soldering operations.

These operations entail the onset of mechanical stresses between the connections and the power supply lines and the corresponding seats, and such stresses may compromise the efficiency of the junctions to the external lines.

Further, said Hall-effect sensors are often rigidly coupled to a printed circuit, which in turn has to be inserted in a suitable receptacle inside the brush supporting cover (or flange).

Such printed circuit, too, is subjected to welding operations.

The printed circuit, which is a rigid body, is suitable to interface with other bodies for example by means of four or six power supply lines.

Therefore, the welding operations entail, for the printed circuit, the triggering of mechanical stresses both during assembly, caused by the dimensional quality of said circuit and of the electrical junctions connected thereto, and after assembly, due to the subsequent handling processes or to the vibrations of the machine in which the electric motor is installed.

These mechanical stresses can lead to damage to the electrical junctions and to the consequent lack of electrical continuity.

SUMMARY OF THE INVENTION

The aim of the present invention is to provide an electric motor that is capable of obviating the problems and drawbacks noted in the above described operations for assembling known types of motor.

Within this aim, an object of the present invention is to provide an electric motor that is compact and can be installed without particular space occupation problems in a plurality of devices that contain electric motors or gearmotors, such as for example power window controls, parking brakes, door and trunk opening/closing units, actuation systems for locks, movement systems for seats, et cetera.

Another object of the present invention is to provide an electric motor in which the electrical parts are safer and stronger than those of known types of electric motor.

Another object of the present invention is to provide an electric motor that can be manufactured cheaply with known systems and technologies.

This aim and these and other objects that will become better apparent hereinafter are achieved by an electric motor, of the type that comprises a shell for a rotor, which is closed by a cover provided with a hole for the passage of the motor shaft, said cover accommodating and supporting brushes for sliding contact on a commutator for supplying power to said rotor, at least one sensor for detecting the rotation rate of said rotor and connections for signal transmission and power supply of said sensor, said electric motor being characterized in that said at least one sensor and said connections for the transmission of its signals and for supplying it with power are accommodated in a receptacle, which in turn is suitable to be inserted in a complementarily shaped seat in said cover.

BRIEF DESCRIPTION OF THE DRAWINGS

Further characteristics and advantages of the present invention will become better apparent from the following detailed description of a preferred but not exclusive embodiment thereof, illustrated by way of non-limiting example in the accompanying drawings, wherein.

DESCRIPTION OF THE PREFERRED EMBODIMENTS

Figure 1:
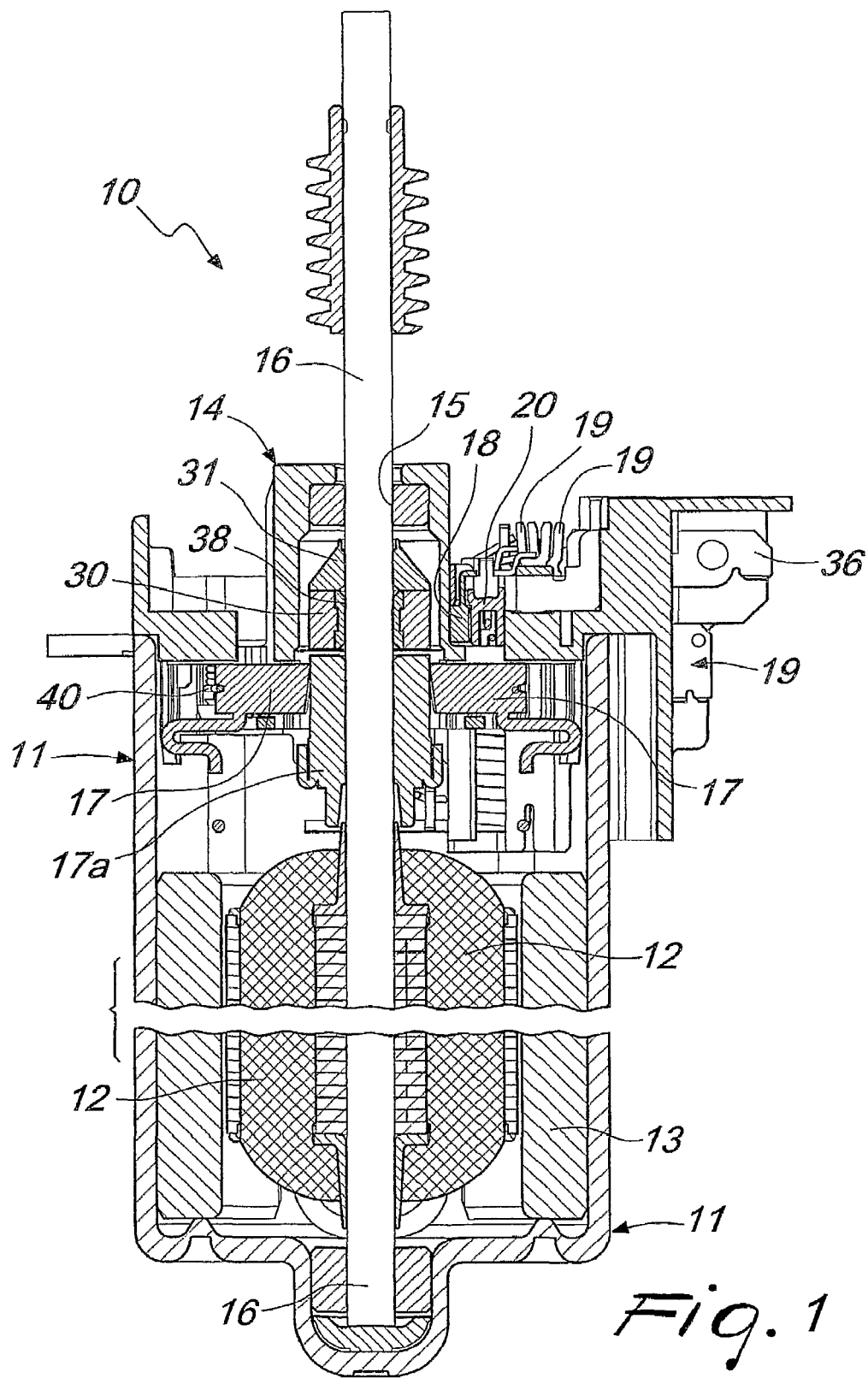
FIG. 1 is a sectional side view of an electric motor according to the invention.
Figure 2:
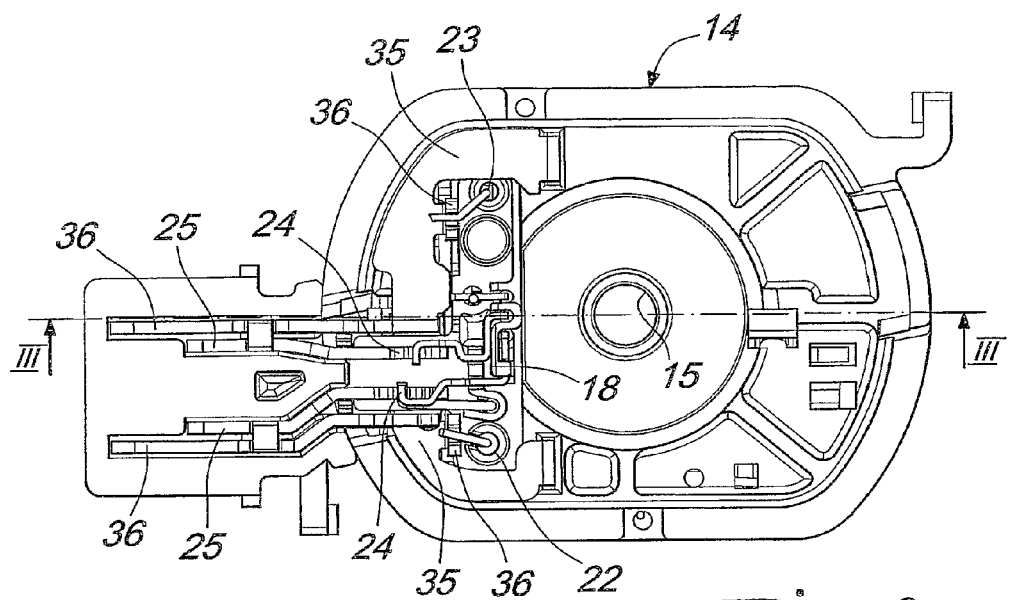
FIG. 2 is a top view of an electric motor according to the invention.
Figure 3:
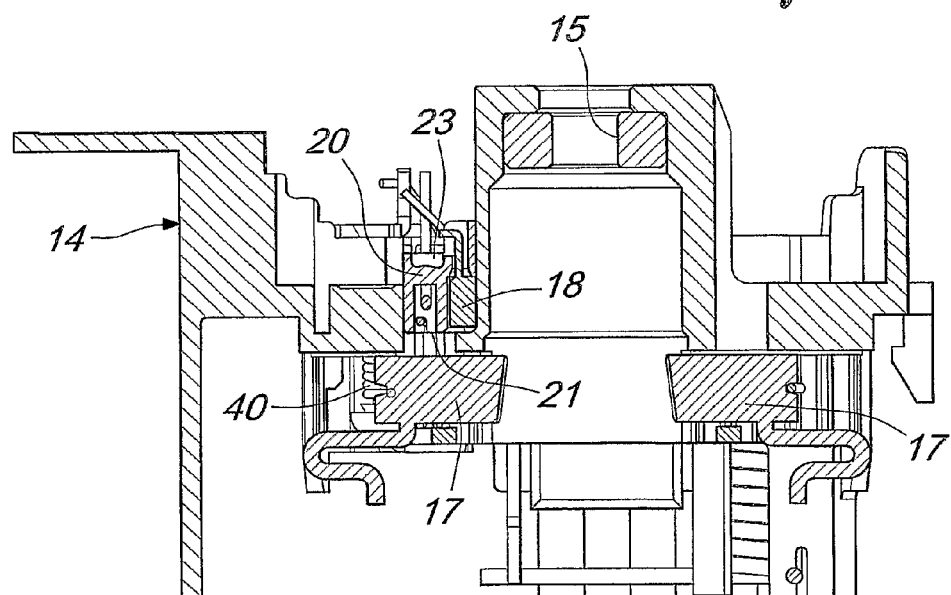
FIG. 3 is a view of a portion of the cross-section designated by the line III-III in FIG. 2.
Figure 5:
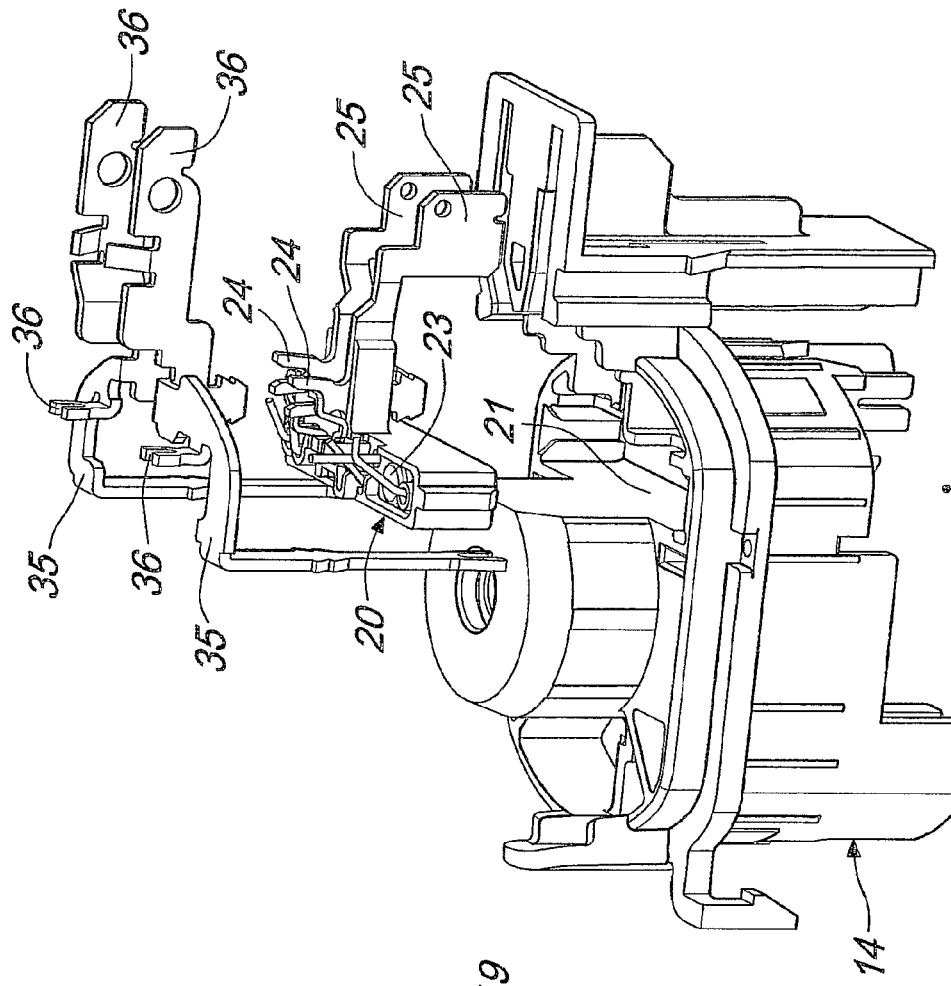
FIG. 5 is an exploded view of said cover, said receptacle and other details.
Figure 4:
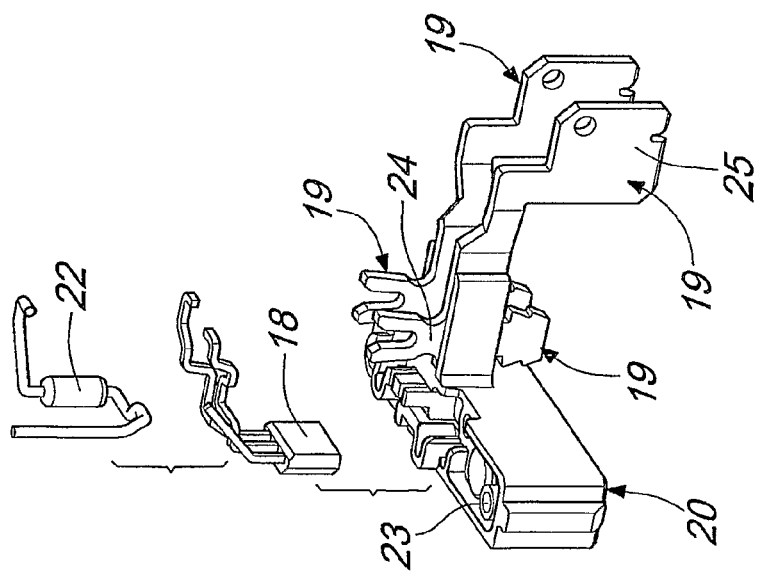
FIG. 4 is an exploded view of said removable receptacle of an electric motor according to the invention and of its contents.

With reference to the figures, an electric motor according to the invention is generally designated by the reference numeral 10.

The motor 10 comprises a shell 11 for a rotor 12, which faces a stator 13.

The shell 11 is closed by a cover 14 provided with a hole 15 for the passage of the motor shaft 16.

The cover 14 is provided with integrated brushes 17 for sliding contact with a commutator 17a for supplying power to the rotor 12, a sensor 18 for detecting the rotation rate of the rotor 12, and connections 19 for signal transmission and power supply of the sensor 18.

The sensor 18 is of the Hall-effect type.

The sensor 18 and the connections 19 for transmitting its signals and for supplying it with power are contained in a box-like receptacle 20.

The sensor 18 and the connections 19 are fitted in the receptacle 20 in a first assembly step.

In a second assembly step, the receptacle 20 in turn is inserted in a complementarily shaped seat 21 on the cover 14.

The receptacle 20 further contains a passive element 22 for the connections 19 for transmitting signals and for supplying power, and a filtering component 23 for the rotor 12.

Two first connectors 24 protrude from the receptacle 20 for the sensor 18 contained therein.

The first connectors 24 are of the type commonly known by the name "Faston".

Two second connectors 25 for supplying power to the sensor 18 also protrude from the same receptacle 20.

The second connectors 25 are constituted by plates made of blanked and bent brass, which are co-molded with the receptacle 20.

A constructive variation of the receptacle 20, not shown, has two connectors for each one of the passive elements 22 and filtering components 23 contained therein.

In the present embodiment, the passive element 22 is a resistor.

The receptacle 20 allows to assemble the sensor 18, the passive element 22 and the filtering component 23 with an operation that is separate from the assembly of the receptacle 20 in the cover 14, protecting them from the onset of mechanical stresses between the respective connections and the power supply lines.

After insertion of the receptacle 20 in its seat 21, the cover 14 is completed by the engagement of two plate-like electrical junction elements 35, which form the electrical power supply connections of the rotor 12.

The cover 14 and the removable receptacle 20 are obtained by molding plastic material.

The plate-like elements 35 are shaped so as to provide third connectors 36 for the filtering component 23 installed in the receptacle 20.

An electric motor 10 according to the invention advantageously allows to avoid fitting a specifically provided printed circuit.

The electric motor 10 insures an electrical insulation resistance between the various electrical lines of the components installed therein that is higher than the resistance ensured by a printed circuit, by virtue of the appropriately preset distances between said lines, which are provided manually in the receptacle 20.

Moreover, the assembly of the sensor 18 and of any passive elements 22 thereof in the receptacle 20, which is separate from the cover 14, allows to perform functional testing of the sensor before fitting it to the cover, with great advantages if replacement is necessary due to a detected malfunction.

The distances between the lines are such as to avoid short circuits that would block the operation of the electric motor.

Further, advantageously, the motor shaft 16 of the electric motor 10 according to the invention rigidly supports, at the sensor 18, a cylindrical magnet 30, which is preceded axially along the direction in which the shaft 16 is assembled in the cover 14, by a conical element 31 for spacing the brushes 17.

The brushes 17 are in fact fitted inside the cover 14 by way of spring-type elastic elements 40, which yield under the pressure of the conical element 31 on the brushes, allowing the brushes 17 to move away from the axis of the motor when the conical element 31 and the magnet 30 that follows it pass.

At the end of the assembly of the shaft 16 to the cover 14, the brushes 17, under the pressure of the elastic elements 40, cling correctly to the commutator 17a.

The cylindrical magnet 30 is made of plastoferrite overmolded over a keying collar 38.

The cylindrical magnet 30 is selectively of the type with two, four, six or eight poles.

The magnet 30, by passing in front of the sensor 18, allows to detect the rotation rate of the shaft 16.

In practice it has been found that the invention thus described solves the problems noted in known types of electric motor.

In particular, the present invention provides an electric motor that is capable of obviating the problems and drawbacks revealed in the above-mentioned operations for assembling known types of motor.

Moreover, the present invention provides an electric motor that is compact and can be installed without particular space occupation problems in many devices that contain electric motors or gearmotors, such as for example power window controls, parking brakes, door and trunk opening/closing units, actuation systems for locks, movement systems for seats, et cetera.

Moreover, the present invention provides an electric motor in which the electrical parts are safer and stronger than those of electric motors of the known type.

Not least, the present invention provides an electric motor that can be manufactured at low cost with known systems and technologies.

In practice, the materials employed, so long as they are compatible with the specific use, as well as the dimensions, may be any according to requirements and to the state of the art.

The disclosures in Italian Patent Application No. PD2004U000038 from which this application claims priority are incorporated herein by reference.

What is claimed is:

1. An electric motor comprising:
   a rotor,
   a motor shaft,
   a shell containing said rotor,
   a cover that covers said shell, said cover being provided with a hole for the passage of said motor shaft, said cover accommodating and supporting brushes for sliding contact on a commutator for supplying power to said rotor,
   at least one sensor for detecting the rotation rate of said rotor,
   connections for signal transmission and power supply of said sensor,
   a rotor filtering component,
   a passive resistance element for said sensor and said connections,
   a box-shaped receptacle, said receptacle holding said sensor, said rotor filtering component, and said passive resistance element,
   said connections for signal transmission and power supply of said sensor comprising first connectors protruding from said receptacle for said sensor, and second connectors for supplying power to said sensor, said second connectors comprising plates that protrude from and are co-molded with said receptacle, said receptacle with said sensor, said rotor filtering component, said passive resistance element, and said sensor connections being inserted in a complementarily shaped seat in said cover, and a pair of plate electrical junction elements that are separate from said receptacle and that are engaged in said cover separately from said receptacle, and said pair of plate electrical junction elements being positioned adjacent to and separately from said plates of said second connectors, and said pair of plate electrical junction elements forming electrical power supply connections for said rotor and connectors for said filtering component in said receptacle.

2. The electric motor of claim 1, wherein said motor shaft rigidly supports, at said sensor, a cylindrical magnet, which is preceded axially, in the direction along which said shaft is fitted through said cover, by a conical element for spacing the brushes.

3. The electric motor of claim 2, wherein said cylindrical magnet is made of plastoferrite overmolded on a keying collar.

4. The electric motor of claim 2, wherein said cylindrical magnet is selectively of the type with two, four, six or eight poles.

5. The electric motor of claim 1, wherein said brushes are fitted inside the cover by way of elastic spring-type elements.

* * * * *